US006819284B2

United States Patent
Maier et al.

(10) Patent No.: US 6,819,284 B2
(45) Date of Patent: Nov. 16, 2004

(54) SYSTEM FOR ASSISTING THE PARKING OF MOTOR VEHICLES IN PARKING SPACES

(75) Inventors: Dietmar Maier, Furth B. Landshut (DE); Frank Gensler, Neubiberg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 38 days.

(21) Appl. No.: 10/229,179

(22) Filed: Aug. 28, 2002

(65) Prior Publication Data

US 2003/0058132 A1 Mar. 27, 2003

(30) Foreign Application Priority Data

Sep. 21, 2001 (DE) .......................... 101 46 712

(51) Int. Cl.[7] .......................... G01S 13/93; H01Q 25/00; B60Q 1/48
(52) U.S. Cl. .......................... 342/70; 340/932.2
(58) Field of Search .......................... 342/70; 340/436, 340/437, 903, 932.2; 367/87, 99, 909

(56) References Cited

U.S. PATENT DOCUMENTS 3,898,653 A * 8/1975 Ban et al. .................. 342/70
5,731,779 A * 3/1998 Kikuchi ..................... 342/70
6,265,968 B1   7/2001 Betzitza et al.

FOREIGN PATENT DOCUMENTS

| DE | 3728948 | 3/1989 |
| DE | 19932779 | 1/2001 |
| DE | 19806150 | 7/2001 |
| DE | 201 05 340 | 8/2001 |
| EP | 0 305 907 | 3/1989 |
| EP | 1 068 992 | 1/2001 |

OTHER PUBLICATIONS

European Search Report dated Nov. 26, 2003.
Search Report.

* cited by examiner

Primary Examiner—Ian J. Lobo
(74) Attorney, Agent, or Firm—Crowell & Moring LLP

(57) ABSTRACT

A system is provided for assisting with parking of motor vehicles in parking spaces, having at least one transmitter, arranged on the exterior side of the vehicle for transmitting a signal emitted at least approximately perpendicularly to the longitudinal axis of the vehicle and limited to a small emission angle range, and an assigned receiver for the reflected signal. The transmitted signal is formed of two partial beams having approximately flat surface area emission characteristics, the two areas being situated at least approximately perpendicular with respect to one another.

8 Claims, 2 Drawing Sheets

SYSTEM FOR ASSISTING THE PARKING OF MOTOR VEHICLES IN PARKING SPACES

BACKGROUND AND SUMMARY OF THE INVENTION

This application claims the priority of German Application No. 101 46 712.5, filed Sep. 21, 2001, the disclosure of which is expressly incorporated by reference herein.

The invention relates to a system for assisting the parking of motor vehicles in parking spaces, having at least one transmitter, which is arranged on the exterior side of the vehicle, for a transmitted signal emitted at least approximately perpendicularly to the longitudinal axis of the vehicle and limited to a small emission angle (beam angle) range, and an assigned receiver for the reflected signal.

Various known systems for assisting the parking of vehicles in parking spaces provide at least one distance sensor for measuring parking spaces. The distance sensor is mounted on the vehicle side facing the curb and, perpendicular to the driving direction, while passing, measures the length (compare German Patent Document DE 3728948 A) and optionally, in the case of limited-depth parking spaces (for example, as a result of the curb), also their depth. In this case, ultrasonic and radar distance measuring systems (such as 24 GHz systems) with conical beam lobes are used as distance sensors. Because of the cross-sectional area of the antenna, in the case of the radar systems, beam angles of approximately 60° are used. In the case of less expensive ultrasonic systems, smaller angles can also be used. A distance sensor in this case is a transmitter/receiver having an electronic analyzing system on its output side.

In contrast to light, the described distance sensors operate using relatively large wavelengths (for example, 12.5 mm@24 GHz and 8.6 mm@40 kHz US). As a result, irradiated objects, which have a degree of roughness below this wavelength, reflect the irradiation like ideal mirrors.

Since the sensors supply only distance-related information and no directional information, objects captured in the beam cone must be positioned on the beam axis. However, the estimation of the direction by means of triangulation when two or more sensors are used will be successful only if precisely the same object site is measured. This cannot be done by means of objects reflecting in the manner of a mirror because here only perpendicularly impinging radiation is reflected back into the receiver.

The measuring of parking spaces has two basic problems: First, the geometrical shape of the parking space boundaries (box-shaped or rounded) influences the longitudinal measurement; second, there is the indistinguishability between relevant raised objects (for example, posts or vehicles) and irrelevant road-related objects (small stones, lawn rocks). Also, a differentiation between these object classes cannot be achieved by a triangulation of sensors arranged horizontally side-by-side.

The detection of the parking space depth (curb detection) requires relatively large beam angles of the sensor lobe(s). However, this reduces the positional precision and the directional accuracy for the longitudinal measuring. In the case of rounded parking space boundaries, the front of the rearward boundary is still seen in the rear view when the axis of the sensor lobe has already left it; the rear side of the forward boundary is already detected in the front view before the axis of the sensor lobe is at its height. This has the result that the measured space length seems smaller than it is. This deviation becomes more serious as a wider transmitter beam lobe is selected.

It is an object of the invention to provide a parking assistance system for parking vehicles in parking spaces of the above-mentioned type which, with low expenditures, results in reliable information concerning the actual shape of a parking space.

The invention achieves this object by providing a system for assisting the parking of motor vehicles in parking spaces, having at least one transmitter, which is arranged on the exterior side of the vehicle, for a transmitted signal emitted at least approximately perpendicularly to the longitudinal axis of the vehicle and limited to a small emission angle range, and an assigned receiver for the reflected signal. The transmitted signal is formed of two partial beams, which have approximately flat surface area emission characteristics, the two areas being situated at least approximately perpendicular with respect to one another.

An adjacent arrangement of two distance sensors 1 and 2, preferably disposed in a common housing at a forward corner point of the motor vehicle, which distance sensors 1 and 2 supply two transmitted signals of a different beam geometry and together generate a "cross lobe", can clearly reduce the two above-mentioned basic problems. For reasons of cost, ultrasonic sensors are preferably considered for this purpose, but naturally the principle analogously applies to radar sensors.

Other objects, advantages and novel features of the present invention will become apparent from the following detailed description of the invention when considered in conjunction with the accompanying drawings.

DETAILED DESCRIPTION OF THE DRAWINGS

Referring to the figures, the sensor 1 has a narrow (approximately 10° to 20°) beam lobe 1' in the horizontal direction, and a wide (approximately 30° to 60°) beam lobe 1' in the vertical direction. The beam lobe can be approximated as an area whose normal line extends horizontally in the driving direction. Sensor 2 has the same geometrical configuration, but is rotated by 90° (beam lobe 2'). The axes of both sensors point horizontally parallel at a right angle to the driving direction. The area normals of the two sensors are perpendicular to one another. Instead of the illustrated construction, the area normals can also be inclined by 45° respectively against the driving direction.

The vertical alignment of the center axes of the beam lobes 1' and 2' is a function of the installation height of the sensors 1 and 2 and is ideally selected such that the lobe 2' impinges on the road surface with a noticeable intensity only at a larger distance from the vehicle. In contrast to the above-mentioned known systems with a conical beam lobe, this has the advantage of preventing the occurrence of ground echoes, for example, as a result of gravel, manholes or other road-related objects. The beam lobe 2' looks beyond these objects and only detects objects which are at a greater distance from the vehicle. Depending on the installation height, it is therefore possible to not detect a curb or to detect it only starting at a certain height.

The beam lobe 1' expanded in the vertical direction, will impinge upon the road surface with a noticeable intensity already at a short distance from the sensor. Thus, for example, small stones situated there will become noticeable as objects detected by the sensor 1. Generally, the distance values of these objects fluctuate depending on the distribution of the objects on the ground, whereas curbs passed along longer routes by the vehicle result in uniform distance values. If the sensor 1 therefore detects objects which fluctuate with respect to the distance, and sensor 2, which looks beyond these objects, determines no object information or uniform distance information at a larger distance, it can be assumed that the parking space is accessible for parking the vehicle.

Figure 1:
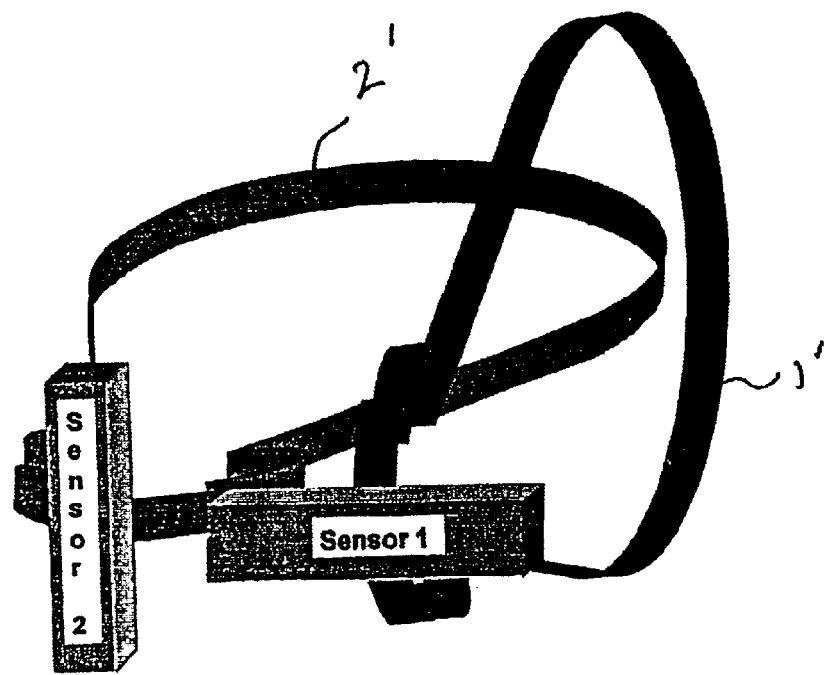
FIG. 1 is a diagrammatic illustration of an adjacent arrangement of two distance sensors in accordance with the present invention.
Figure 2:
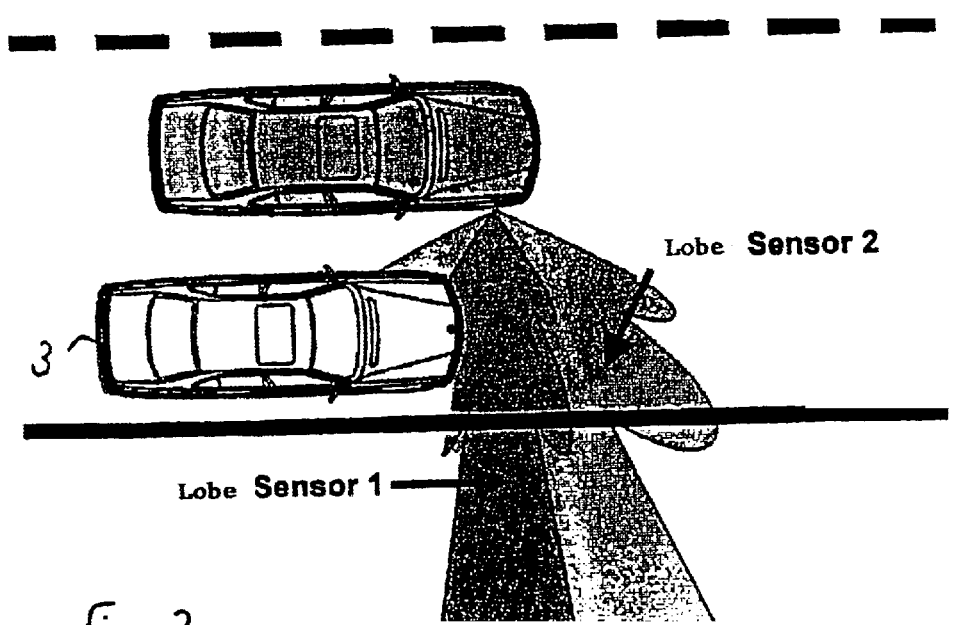
FIG. 2 is a diagram illustrating a vehicle's use of the present invention.

By comparing the distance-dependent backscattering amplitudes of the two sensors 1 and 2 while driving past an obstacle or, as illustrated in FIG. 2, a parked vehicle 3, the shape of the parking space boundaries (angular or rounded) can be determined.

Figure 3:
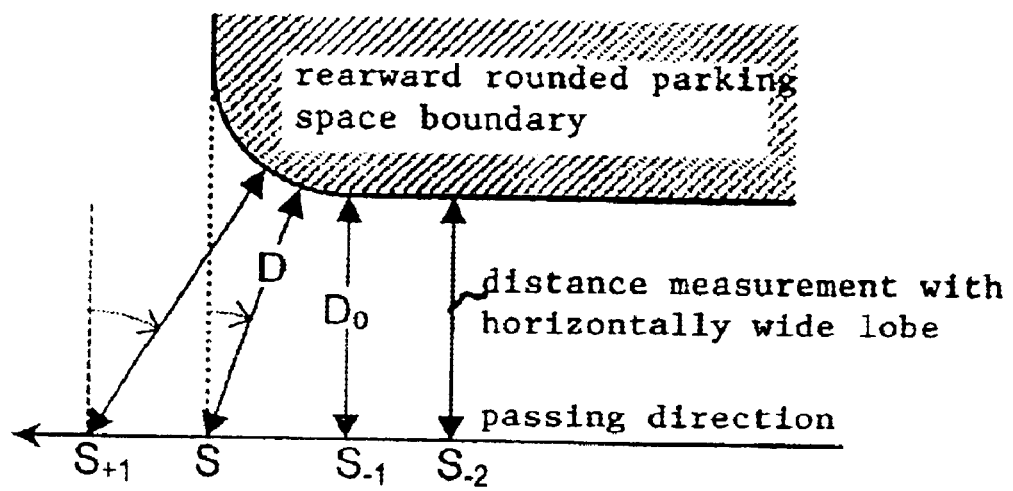
FIG. 3 is a diagram illustrating the operation of the present invention.

With reference to FIG. 3, the method of operation of the system according to the invention will be explained in greater detail.

It is assumed that the rearward parking space boundaries are box-shaped. While driving past the parking space (see passing direction arrow), the sensor 1 supplies almost the same object information as the sensor 2 because the surface area of the lateral surface of the parking space boundaries irradiated in the reflection direction is almost indistinguishable for the two sensors. Then, after passing the front side of the parking space boundary, virtually no surface elements will be in the reflection direction any longer for both sensors, hence, the intensity of the distance signals drop off abruptly for both sensors.

However, if the front side of the rearward parking space boundary is rounded, then after passing its front surface, the backscattered intensity of sensor 1 will drop off significantly faster as a result of the increased focusing in the horizontal direction than that of sensor 2 which, by because of its horizontally wide lobe, still detects the rounded boundary longer in the rear view.

In FIG. 3, the parking space starts at S. Because of the rear view, the distance D measured there is already larger than D0. Depending on the geometrical shape, the sensor 1 with the horizontally narrower lobe no longer already finds any surface fractions there based on the reflections; however, the ground signal (clutter) rises clearly from distances greater than D0. The path-dependent development of this ground potential therefore offers a correction possibility for determining the end of the parking space boundary.

The corresponding situation applies to the detection of the rear side of the forward parking space boundary.

An avoidance of a mutual influencing of the two sensors can be ensured by the selection of slightly different operating frequencies, an alternating method of operation or suitable modulation processes.

As a result of a combination of two inexpensive sensors 1 and 2, an operating capacity will be achieved, which alternatively could only be achieved at significantly higher-expenditures and with more expensive sensors (e.g., multi-beam or scanner systems). The measuring precision for the parking space length is influenced much less by different geometrical parking space boundary shapes.

This increases the utilization ratio of driver assistance systems based on this measurement, by means of which, for example, the parking maneuvers can be assisted or automatically implemented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:

a vehicle body having an exterior side;

a parking assistance system for the vehicle, the parking assistance system including at least one transmitter arrangeable on an exterior side of a vehicle, the transmitter transmitting a signal at least approximately perpendicular to a longitudinal axis of the vehicle, this signal having a small beam angle range;

a receiver associated with the transmitter to receive reflected signals;

wherein the transmitted signal is formed of two partial beams having approximately flat surface area emission characteristics, the two surface areas being situated at least approximately perpendicular with respect to one another.

2. The system according to claim 1, wherein each partial beam has an area normal, one of the area normals being oriented horizontally and another being oriented vertically.

3. The system according to claim 1, wherein the two partial beams are generated by separate transmitters, the transmitters being arranged in a common housing.

4. The system according to claim 2, wherein the two partial beams are generated by separate transmitters, the transmitters being arranged in a common housing.

5. The vehicle according to claim 1, wherein the transmitter is arranged at a forward corner point of the vehicle body.

6. The vehicle according to claim 2, wherein the transmitter is arranged at a forward corner point of the vehicle body.

7. The vehicle according to claim 3, wherein the common housing is arranged at a forward corner point of the vehicle body.

8. The vehicle according to claim 4, wherein the common housing is arranged at a forward corner point of the vehicle body.

* * * * *